United States Patent Office 3,453,803
Patented July 8, 1969

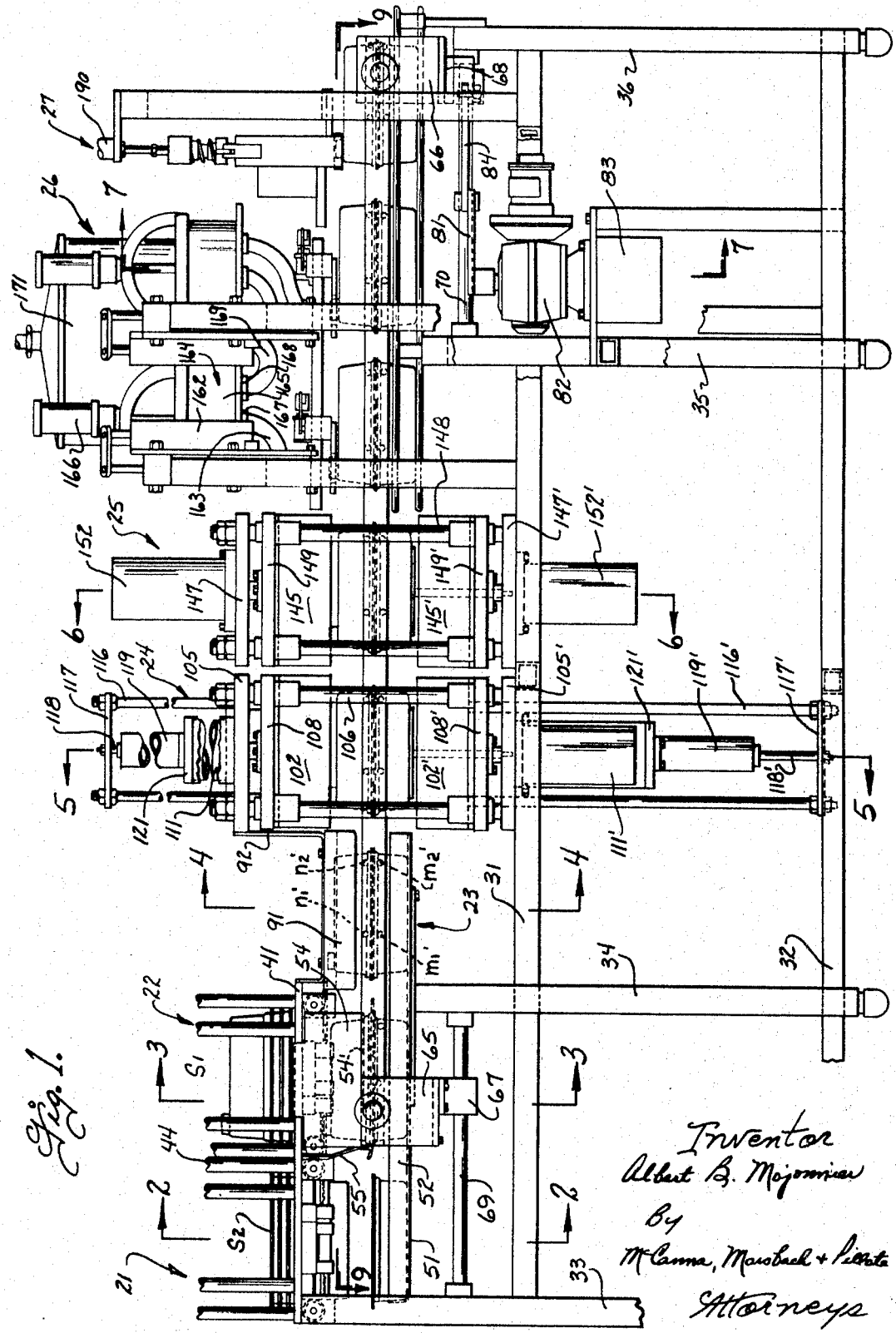

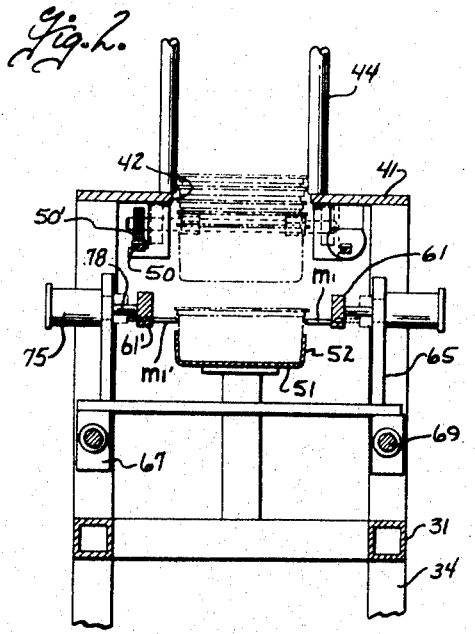
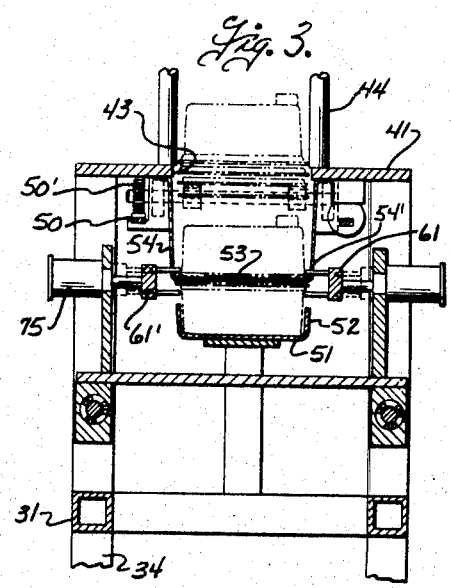
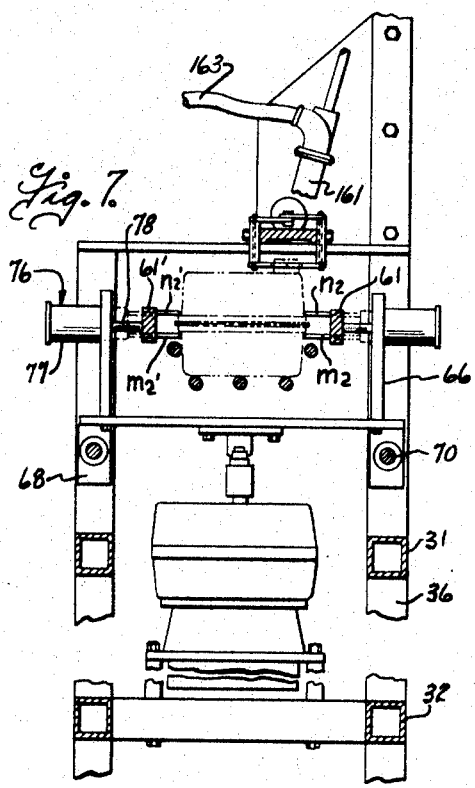
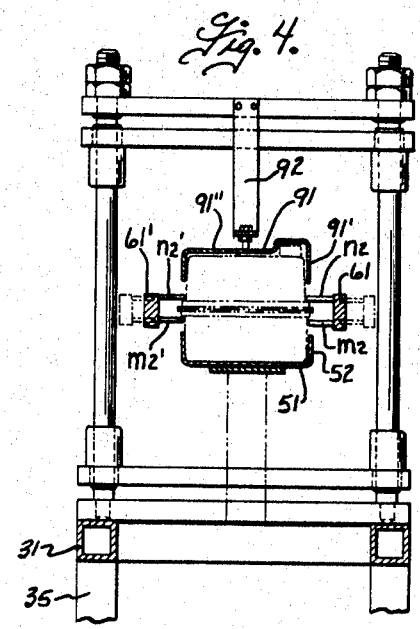

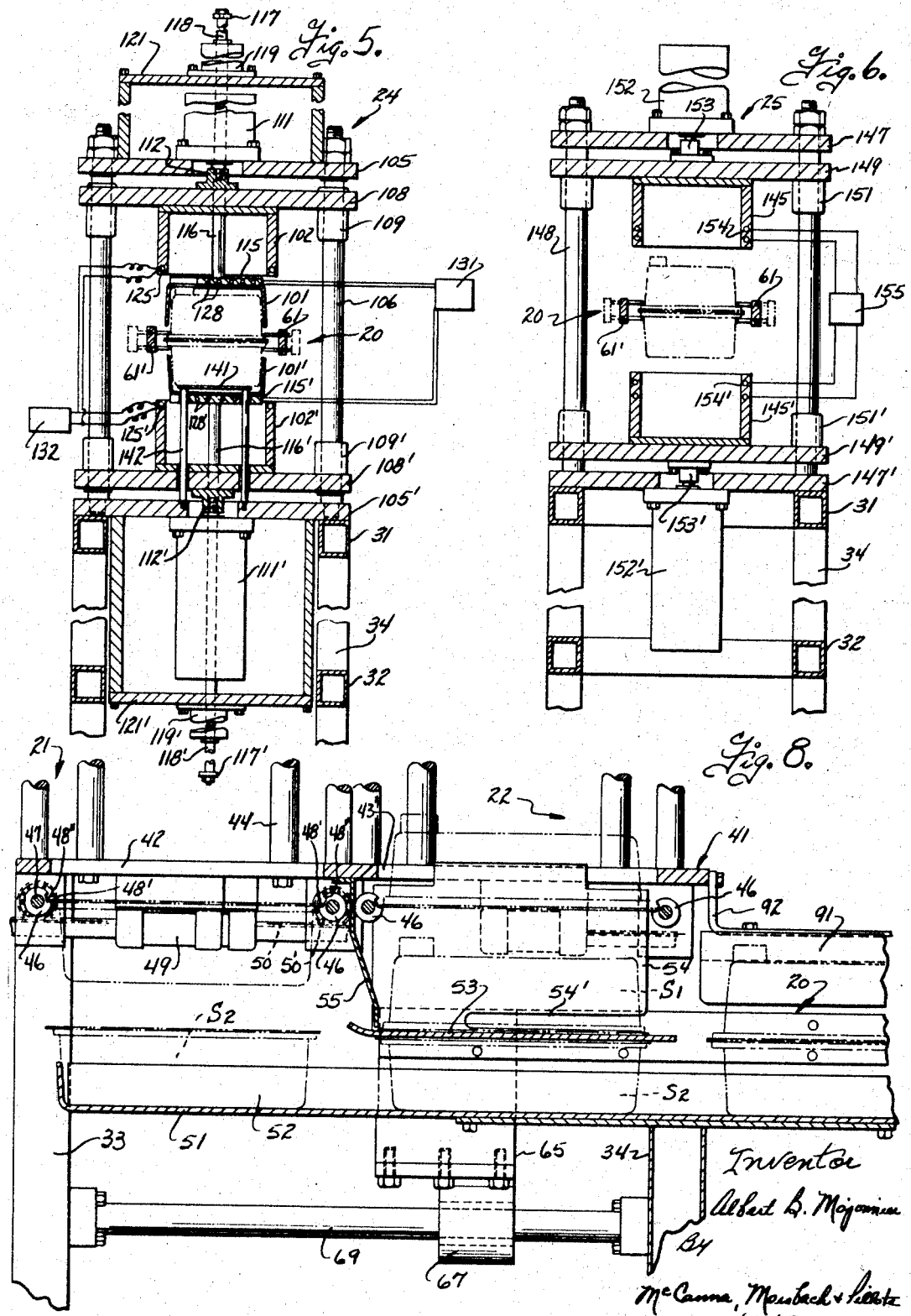

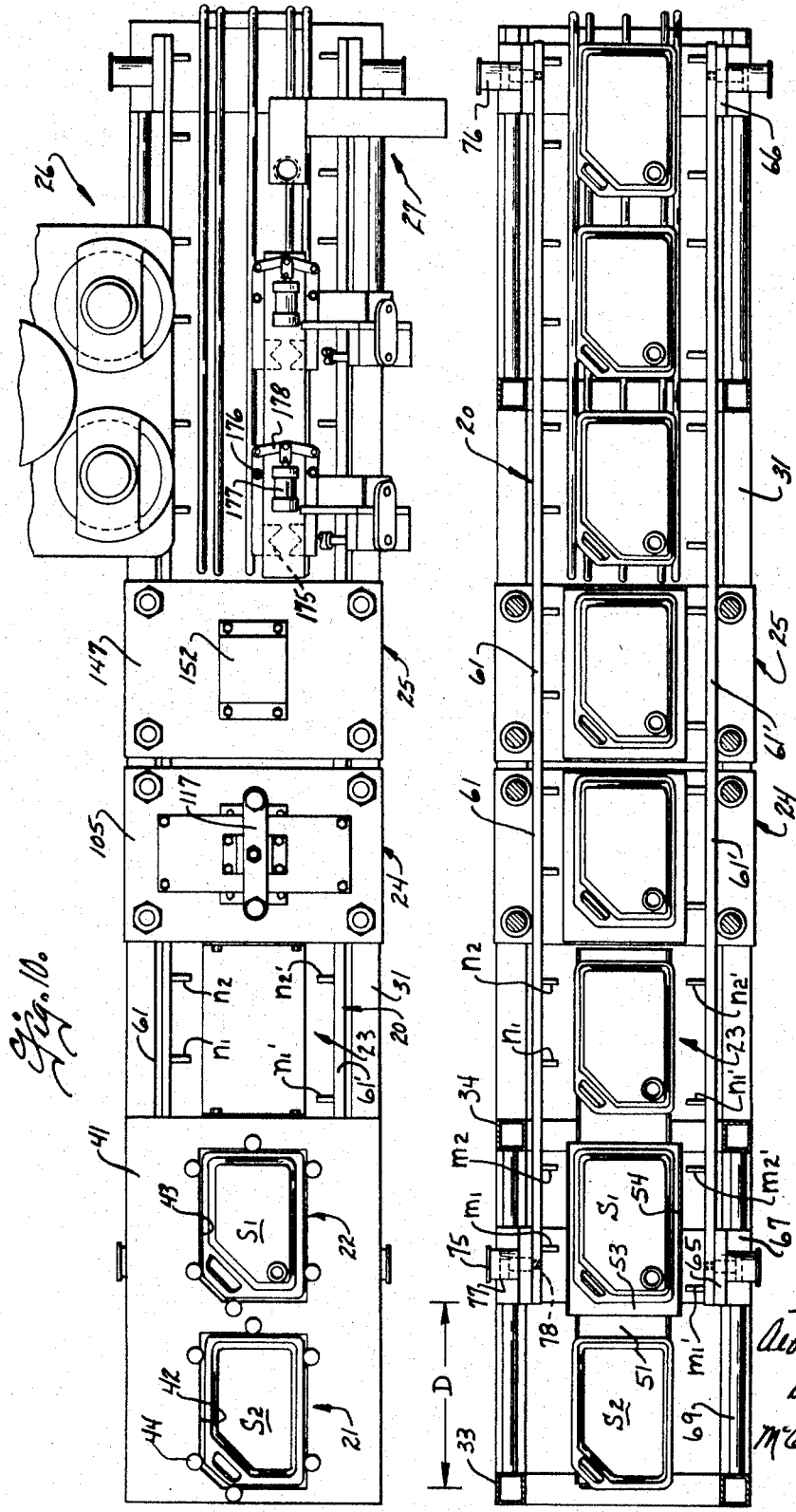

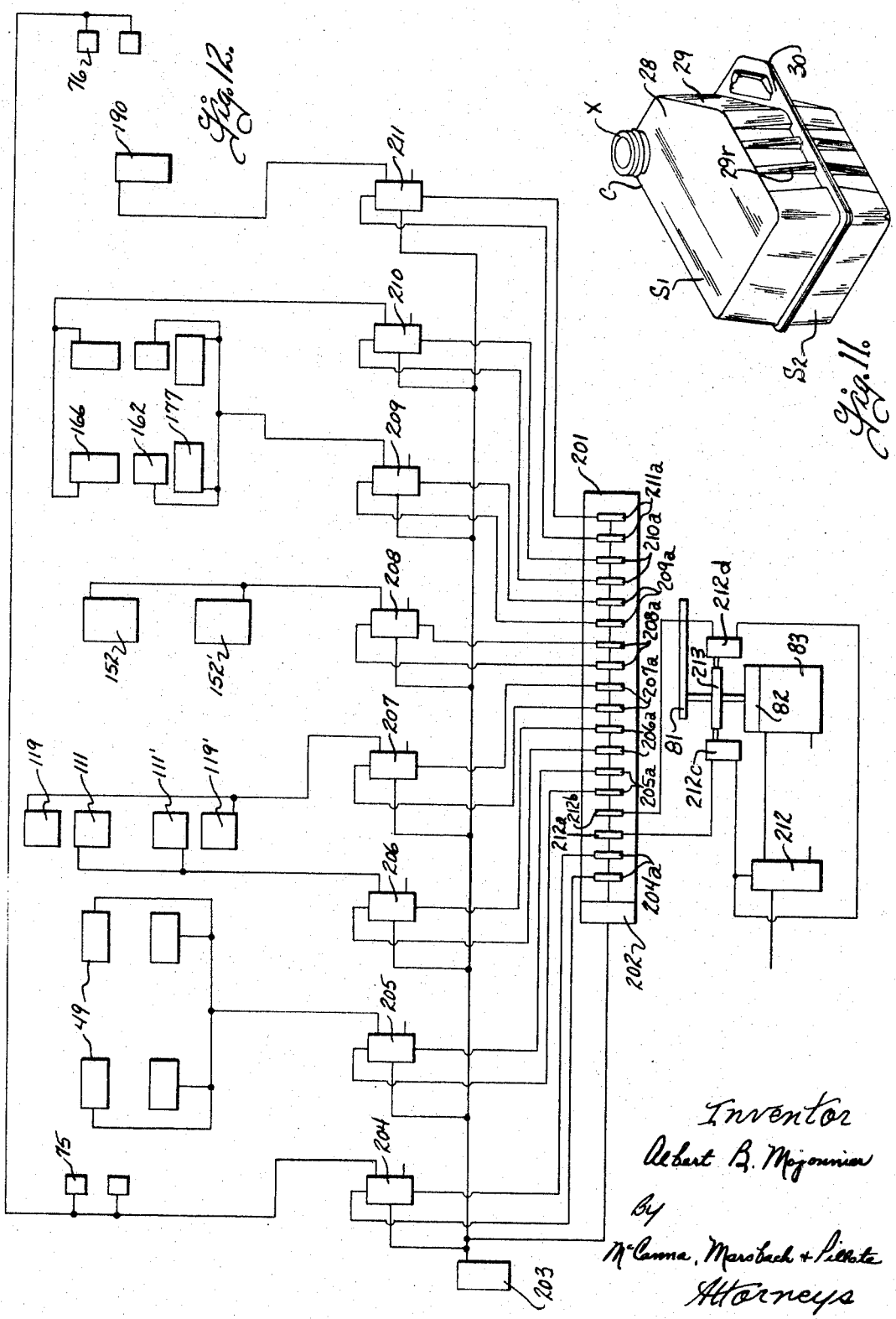

3,453,803
PACKAGING APPARATUS
Albert B. Mojonnier, Chicago, Ill., assignor to Albert Mojonnier, Inc., Franklin Park, Ill., a corporation of Illinois
Filed June 16, 1966, Ser. No. 557,941
Int. Cl. B65b 5/02
U.S. Cl. 53—183                                12 Claims

ABSTRACT OF THE DISCLOSURE

An apparatus for dispensing preformed cup-like shells, for assembling the shells in opposing face-to-face relation, and for advancing the assembled shells to a sealing station where the shells are joined together. The transfer apparatus that advances the shells to the sealing station also advances the container formed by the joined shells away from the sealing station to subsequent filling and capping stations.

---

This invention relates to packaging apparatus.

It has heretofore been proposed to preform cup-like shells and to join the same together along their open sides to form containers. The shells are preferably formed of thermoplastic material and joined together by heat sealing, and a preferred apparatus for joining the cup-like shells includes opposed shell engaging jaws which are movable into and out of opposing registry to seal the cup-like shells together along their open sides. It is a general object of the present invention to provide apparatus for delivering the cup-like shells properly oriented and arranged to the sealing station between the shell engaging jaws, and for advancing the container away from the sealing station after the shells have been joined together.

Another object of this invention is to provide a packaging apparatus for forming containers from cup-like shells and which minimizes the time required to advance the cup-like shells to the sealing station and to remove the container formed by the joined shells from the sealing station, to thereby minimize the overall cycle time of the packaging apparatus.

A more particular object of this invention is to provide a packaging apparatus for forming containers from cup-like shells wherein the cup-like shells are dispensed at a point offset from the sealing station; assembled in opposed face-to-face relation and advanced in assembled relation to the sealing station.

A further object of this invention is to provide a packaging apparatus for forming containers from two cup-like shells, and which has a common transfer mechanism for engaging and advancing both shells in unison to the sealing station and for advancing the container formed by the joined shells away from the sealing station.

These, together with other objects and advantages of this invention will be mode readily understood by reference to the following detailed description when taken in connection with the accompanying drawings wherein:

FIGURE 1 is a side elevational view of the packaging apparatus embodying the present invention;

FIG. 2 is a transverse sectional view taken on the plane 2—2 of FIG. 1 and illustrating a first shell dispenser;

FIG. 3 is a transverse sectional view taken on the plane 3—3 of FIG. 1 and illustrating a second shell dispenser;

FIG. 4 is a transverse sectional view taken on the plane 4—4 of FIG. 1 and illustrating assembly of the shells in opposing face-to-face relation;

FIG. 5 is a transverse sectional view taken on the plane 5—5 of FIG. 1 and illustrating the shell joining apparatus;

FIG. 6 is a transverse sectional view taken on the plane 6—6 of FIG. 1 and illustrating the cooling station for cooling the heat sealed shells;

FIG. 7 is a transverse sectional view taken on the plane 7—7 of FIG. 1 and illustrating the container filling station;

FIG. 8 is a fragmentary longitudinal sectional view through the shell dispensing stations, and illustrating the parts on a larger scale than FIG. 1;

FIG. 9 is a horizontal sectional view taken on the plane 9—9 of FIG. 1;

FIG. 10 is a plan view of the packaging apparatus;

FIG. 11 is a perspective view of a container of the type adapted to be formed by the packaging apparatus of the present invention; and FIG. 12 is a schematic diagram illustrating a suitable control system for operating the several parts of the packaging apparatus in timed relation.

The packaging apparatus of the present invention is arranged to dispense first and second preformed cup-like shells, assemble the shells in face-to-face relation, advance the same to a sealing station, and join the shells together to form a container. The packaging apparatus can also advantageously be arranged to fill the containers and to cap the containers. In the embodiment illustrated, the packaging apparatus includes first and second dispensers 21 and 22, an assembling station 23, and a sealing apparatus 24 for joining the shells together. A transfer mechanism 20 is provided for advancing the shells from the dispensers 21 and 22 past the assembling station 23 to the sealing apparatus 24. The sealing apparatus is preferably of the type which heat seals the containers together and a cooling apparatus 25 is provided for cooling the heat sealed joint. In addition, the packaging apparatus preferably includes a filler mechanism 26 and a capping mechanism 27. The several mechanisms are conveniently mounted on a common frame structure and operated in timed relation with each other in the manner described hereinafter.

The packaging apparatus is arranged to form containers by assembling and joining preformed cup-like shells along a medial seamline. The containers are preferably formed of a thermoplastic material such as polyethylene, polystyrene, polyvinylchloride, polypropylene, etc., which can be heat sealed together. The containers designated C formed by the apparatus can be of widely different shape and configuration, determined by the shape and configuration of the shells S1 and S2 which are used in the forming of the containers. One suitable container is illustrated herein, and as best shown in FIG. 11, the shells S1 and S2 are generally similar in shape and each includes a face wall 28 and perimetric side walls 29 extending around the face wall. The shells are preferably formed with out-turned flanges at their open sides which are adapted to be joned together. The container has a spout formed thereon to enable filling and dispensing liquid from the container and, in the form shown, the spout X is formed on one of the shells such as S1. The shells S1 and S2 can be preformed in a suitable manner and may, for example, be formed from sheet material as by die forming between mating dies; drape forming; pressure or vacuum forming, etc.

The support frame for the packaging apparatus can be of any suitable construction and, in the embodiment illustraed, includes longitudinal extending upper and lower frame members 31 and 32 which are supported by posts 33–36 conveniently arranged in pairs and secured to the frame members in spaced points therealong. The shell dispensers 21 and 22 are conveniently mounted on a plate 41 supported on the upper ends of the posts 33 and 34. The plate 41 has openings 42 and 43 to allow passage of the shell members S1 and S2 therethrough and guides 44 extend upwardly around the openings to laterally guide stacks of shell members. The mechanism for dispensing shells from the respective stacks, one at a time, may be of any suitable construction. In the embodiment shown, the dispensing mechanism includes cam wheels 46 (FIG. 8) located adjacent opposite ends of the respective openings 42 and 43 and mounted for rotary oscillatory movement on shafts 47. The cam wheels are formed with notches in their periphery defining angularly spaced faces 48′ and 48″ and the cam wheels are operative in one position as shown in FIG. 8 to support the lowermost shell in the respective stack with the flange on the shell resting on the faces 48′. A means, such as linear fluid operators 49 are connected to the shafts 47 as through a rack 50 and pinion 50′ to simultaneously rotate the rotary cams at opposite sides of each stack in relatively opposite directions to move the faces 48′ of the cams downwardly away from the lowermost container while simultaneously moving the other faces 48″ against the upper face of the shell flange on the lowermost shell to positively force the same off the end of the stack. The superposed shells in the stack remain supported on the periphery of the cam members until the latter are returned to their position shown in FIG. 8 to allow the lowermost shell to drop into the notches. The dispensing mechanism for the dispenser 22 is the same as previously described in connection with the dispenser 21, and like numerals are used to designate the same parts.

The packaging apparatus is arranged so as to assemble the shells S1 and S2 in opposing face-to-face relation prior to advancing the shells to the sealing station 24. For this purpose, the first shell dispenser is arranged to dispense the shells S2 with the open side of the shell facing in one direction, herein shown facing upwardly, and the second shell dispenser 22 is arranged to dispense the shells S1 with the open side facing in a relatively opposite direction, herein shown facing downwardly. A first shell support is provided for supporting the dispensed shells S2 and, in the embodiment shown, the first shell support comprises an elongated tray 51 which extends from a position below the first shell dispenser 21 longitudinally of the machine below the second shell dispenser 22 and past the assembling station 23 to a point adjacent the sealing station 24. The tray 51 is preferably formed with lateral shell guides 52 (FIGS. 2–4) to laterally guide the shells S2 during movement to the sealing station. A second shell support is provided for supporting the shells S1 and, as shown, comprises a second tray 53 disposed below the second shell dispenser and spaced above the first tray a distance slightly greater than the height of the shells S2, to allow the last mentioned shells to pass below the tray 53. The tray 53 is conveniently supported on the plate 41 by lateral guide plates 54 which are secured to the plate 41 and extend downwardly along opposite sides of the shell, as best shown in FIGS. 1 and 3. A further guide finger 55 is preferably attached to the plate 41 to extend downwardly along the trailing edge of the opening 43 to aid in longitudinally positioning the shell S1, as it is dispensed on the tray 53.

The shell dispensers 21 and 22 are preferably operated to simultaneously dispense the shells S2 and S1 onto the trays 51 and 53 below the respective dispenser and a transfer mechanism is provided for advancing the shells to move a shell S2 on the tray 51 to a position below the shell S1 on the tray 53, and for thereafter advancing the shells S1 and S2 in unison to the sealing station. The transfer mechanism 20 includes a first or lower set of fingers disposed at relatively opposite sides of the lower shell S2, and a second or upper set of fingers also disposed at relatively opposite sides of the upper shells S1, and means are provided for moving the upper and lower sets of fingers in unison with each other sequentially inwardly to engage the respective upper and lower shells; longitudinally in one direction to advance the upper and lower shells to the next succeeding station; outwardly to release the shells and thence longitudinally in a relatively opposite direction back to their initial position. The upper and lower sets of fingers are arranged in groups, with each group arranged to engage a respective one of the shells. The groups must comprise at least a pair of fingers in relatively opposite sides of each shell for engaging and advancing the same and, preferably, the fingers are arranged in groups of at least four fingers designated in FIG. 9 as M1, M2, M1′ and M2′ in the lower set and N1, N2, N1′, and N2′ in the upper set. As will be seen, the fingers M1, M2 engage one side of the lower shell S2 and the fingers M1′, M2′ engage a relatively opposite side of the shell S2. Similarly, the fingers N1 and N2 engage one side of the upper shell and the fingers N1′, N2′ engage the other side of the upper shell. While the fingers can be adapted to merely frictionally engage the sides of the respective shells to advance the same, it is preferable to shape and arrange the fingers so as to engage some protuberance, shoulder or the like on the respective shell to aid in longitudinally positioning the same. In the containers shown, the shells are formed with ribs 29r on the side walls and the fingers are advantageously arranged so as to engage these ribs to facilitate advancing the shells. Alternatively, the fingers can be arranged so as to engage the ends of the shells to longitudinally locate and advance the shells therewith.

The lower and upper fingers disposed at one side of the shells, designated as M1, M2 and N1, N2 are advantageously mounted on a common transfer bar 61 and, similarly, the lower and upper fingers at the other side of the containers, designated M1′, M2′ and N1′, N2′ are advantageously mounted on a second transfer bar 61′. The transfer bars 61 and 61′ are mounted for longitudinal reciprocation in unison with each other and, in the embodiment shown, are supported on generally U-shaped yokes designated 65 and 66 adjacent relatively opposite ends thereof. The yokes are supported as by bearing blocks 67, 68 on longitudinally extending guide bars 69, 70. As best shown in FIG. 1, the bars 69 are mounted on the main frame structure, as by attachment to the posts 33 and 34 and the bars 70 are mounted on the main frame structure by attachment to the posts 35 and 36. The transfer bars 61 and 61′ are also mounted for movement laterally of their lengthwise dimension to move the shell engaging fingers into and out of engagement with the respective shells. In the embodiment illustrated, fluid actuators 75 and 76 are mounted on the yokes 65 and 66 respectively. The fluid actuators each include a cylinder 77 mounted on the respective yoke for movement therewith and a piston in each cylinder having a movable piston rod 78 connected to the respective transfer bar. The fluid actuators 75 and 76 are conveniently of the single acting type and have a spring (not shown) for yieldably urging the same to a retracted position and the pistons are extended in response to application of fluid pressure thereto to move the shell engaging fingers from a retracted position as shown in FIG. 9, to an extended position into engagement with the shells, as shown in FIGS. 2–7.

Any suitable means may be provided for reciprocating the transfer bars and, in the embodiment shown, a crank 81 (FIG. 1) is driven through a speed reducing mechanism 82 from a motor 83. The crank is connected through a link 84 to one of the yokes 65 to thereby reciprocate the transfer members from an initial position in a forward direction to an extended position, in response to rotation of the crank through 180°, and to thereafter return the transfer members back to their initial position in response to the rotation of the crank through a succeeding 180°. A means described hereafter is provided for controlling operation of the motor 83 to drive the crank 81 through successive half-revolutions. The transfer bars and crank are shown in their extended position in FIG. 1 and, when the crank is rotated through one-half revolution from this position, the transfer bars are retracted. The stroke of the crank is preferably selected so that the transfer bars are longitudinally reciprocated through a distance D (FIG. 9) corresponding to the spacing of the shells S2 and S1 when they are respectively dispensed onto the supports 51 and 53. In general, the upper and lower groups of fingers are spaced apart along the bars a distance such that the center-to-center distance between adjacent groups of fingers corresponds to the aforementioned distance D. However, at the inlet end of the transfer bars, only a lower group of fingers is provided for advancing the lower shell. Thus, when the transfer members are moved through one cycle, they are sequentially longitudinally retracted from the position shown in FIG. 1 through a distance D and are then moved laterally inwardly to engage the respective shells and, during subsequent extension, advance the shells a distance corresponding to the distance D. The first group of fingers in the lower set engage the shell S2 at the station 21 and advances the same to a position below the station 22 while the next group of upper and lower fingers engage the upper and lower shells at the station 22 and advance the same in unison along the supports 51 and 53 to a position at the station 23. The shells at the station 23 are advanced by the third group of fingers to the sealing station, and so on through the packaging machine. As is shown in FIG. 1, the lateral shell guides 54 at the second dispensing station are notched as indicated at 54' to allow the upper fingers to pass through the guide into engagement with the upper shell at the second dispensing station. The shell support 53 terminates adjacent the shell assembly station 23 and, as the upper shell is advanced, it moves off the support 53 and into face-to-face registry with a respective lower shell being advanced by the lower group of fingers. As will be seen from FIGS. 2–7, the upper and lower sets of fingers not only advance the respective shells longitudinally through the machine, but also hold the shells in abutting face-to-face relation. An upper shell guide is preferably provided at the assembly station 23 to hold the upper shell in position when the shells are released by the transfer mechanism. As best shown in FIGS. 1 and 4, this upper shell guide includes a downwardly opening U-shaped channel 91 having the depending portions 91' for engaging opposite sides of the shell and a top portion 91" which overlies the top of the shell and retains the same in position. The upper guide channel 91 is conveniently supported by a bracket 92 on the main frame structure.

The shell sealing apparatus is preferably of the type disclosed in my copending application for Method and Apparatus for Heat Sealing Containers, Ser. No. 450,851, filed Apr. 26, 1965, now Patent No. 3,383,260 and constituting improvements in the heat sealing apparatus disclosed in the patent to Mojonnier and Eastman No. 3,152,944. The shell sealing apparatus in general includes upper and lower shell confining members 101 and 101' and upper and lower heat sealing jaws 102 and 102'. The transfer mechanism advances the assembled containers along a path paralleling a medial plane through the flanges of the upper and lower shells, and the upper and lower shell confining members and jaws are arranged for movement toward and away from the aforedescribed medial plane to heat seal and join the shells together. The jaws and shells are mounted on a stationary support structure including upper and lower stationary mounting plates 105 and 105'. The lower plate 105' is conveniently attached to the frame members 31 of the main frame structure and the upper plate 105 is supported in fixed spaced relation to the lower plate by rods 106. The upper and lower heat sealing jaws are mounted for movement toward and away from the medial plane and, as shown, are supported on upper and lower jaw mounting platens 108 and 108' conveniently guided on the rods 106 by sleeves 109 and 109'. Any suitable means may be provided for moving the jaws and, in the embodiment illustrated, the jaws are moved by linear actuators 111 and 111' mounted on the plates 105 and 105' respectively and having their piston rods 112 and 112' connected to the respective jaw mounting platen to move the same. The shell confining members 101 and 101' are also supported for movement relative to the jaw members and toward and away from the aforedescribed medial plane. As shown in FIG. 5, the shell confining members are attached to platens 115 and 115' carried by the lower ends of guide rods 116 and 116' respectively. The guide rods extend through respective ones of the movable jaw mounting platens 108, 108' and stationary support plates 105, 105', and are connected at their other ends through a cross-head 117, 117' to the piston rod 118, 118' of linear actuators 119, 119' respectively. The linear actuators 119, 119' are supported in fixed relation as by U-shaped brackets 121, 121' attached to the respective stationary plates 105 and 105'. The heat sealing jaws 102, 102' may be heated in various ways and, in the embodiment shown, are heated by electrical heating elements 125, 125' (FIG. 5) disposed in the jaws adjacent their outer heat sealing face. In order to prevent further distortion or deformation of the container during heat sealing of the flanges, provision is made for cooling the shell confining members to maintain the temperature of the thermoplastic body below the distortion temperature thereof during heat sealing. In the embodiment shown, the mounting platens 115, 115' are also adapted to function as cooling plates and are formed with coolant passages 128, 128' therein adapted to have a cooling fluid such as water or the like pass therethrough to cool the shell confining members. Coolant such as water may be supplied to the passages 128, 128' from a source 131 diagrammatically illustrated in FIG. 5 and the heating elements 125 and 125' in the heat sealing jaws may be energized as from power source 132, also diagrammatically illustrated in FIG. 5.

The jaws and shell confining members are operated in timed relation with the operation of the transfer mechanism in a manner described hereinafter and, advantageously, the timing is such that the shell confining members move into a position such as shown in FIG. 5 around the respective upper and lower shells before the transfer members are moved laterally outwardly, to thereby maintain the shells in opposing face-to-face relation when the transfer members disengage the same. A container support is preferably provided for supporting the containers as they are released and, as best shown in FIG. 5, the container support includes a platform 141 mounted as by rods 142 that extend through the platens 115' and 108' and are otherwise fixedly secured to the stationary support plate 105. The platform 141 is disposed at a level adjacent the level of the shell support 51 and, in effect, forms a continuation of the same to support the shells when the transfer mechanism is retracted. A shell cooling station is advantageously provided in the packaging machine to cool and preferably form and shape the heat sealed flange, as more fully disclosed and claimed in the copending application of Albert B. Mojonnier, Harry E. Lowe III and Gilbert M. Schlussman, Ser. No. 564,842, filed July 13, 1966. In general, the cooling station 25 includes cooling jaws 145 and 145' which are mounted for movement toward and away from the aforedescribed medial plane. As shown in FIG. 6, upper and lower stationary support plates 147 and 147' are provided, with the lower plate being mounted on the frame member 31 and the upper plate supported in fixed relation to the frame members as by guide bars 148. The upper and lower jaws are mounted on jaw mounting platens 149, 149' conveniently guidably supported as by sleeves 151 and 151' on the rods 148. A means such as linear fluid actuators 152 and 152' are mounted on the stationary support plates and have their piston rods 153, 153' connected to the jaw mounting platens to move the jaws toward and away from each other. Any suitable means may be provided for cooling the jaws 145, 145' and, as shown, they are provided with passages 154, 154' which are adapted to have coolant passed therethrough as from a coolant supply source 155, diagrammatically illustrated in FIG. 6.

The packaging machine is also advantageously adapted to fill the containers after they have been formed. The filling mechanism may be of any convention construction, details of which form no part of the present invention. In the embodiment illustrated, the filling apparatus is of the type disclosed in the copending application of Albert B. Mojonnier for Filling Apparatus, Ser. No. 557,942, filed June 16, 1966, now abandoned. In the embodiment shown, the containers are filled at two successive stations, one-half of the liquid being dispensed into the containers at each station in order to reduce the time required to fill each container and thereby improve the cycle time of the packaging machine. In general, the filling apparatus disclosed includes nozzles 161 (FIG. 7) which are adapted to be extended into and retracted out of the filling spout X of the containers. The nozzles are extended and retracted by fluid actuators 162 (FIG. 1) and fluid is supplied to the nozzles through a flexible hose or the like 163 from a dispenser 164. The dispenser is conveniently in the form of a measuring cylinder 165 having a piston (not shown) therein which is reciprocable under the control of the mechanism such as the fluid actuator 166. The measuring cylinder has an outlet 167 connected to the line 163 leading to the nozzle, and an inlet 168 connected through a line 169 to a source of liquid supply such as a tank 171. Valve mechanism is provided in the dispenser, as disclosed more fully in the aforedescribed application, and operates to allow fluid to flow into the measuring chamber 165 when the piston is raised and to flow out of the measuring chamber through the nozzle when the piston is pushed downwardly. The amount of material dispensed is controlled by the stroke of the piston and its diameter and can be varied by suitable selection of the size of the measuring cylinder and piston and the stroke thereof. A means is preferably provided at the filling station for engaging the spout on the container to accurately position the same with respect to the nozzle. As shown, this means includes a pair of opposed jaws 175 (FIG. 10) which are pivotally supported at 176 for movement toward and away from each other, and a jaw actuator 177 connected through a toggle linkage 178 to the jaws to move the latter between an opened and closed position. The actuators 177 can conveniently be of the fluid operated type.

The packaging apparatus also preferably includes capping mechanism 27, of any suitable construction for applying caps to the containers. The capping mechanism can be of any conventional construction, details of the construction and operation of which form no part of the present invention. In general, the capping mechanism is operated in timed relation with the transfer mechanism by a fluid actuator 190.

Any suitable means may be provided for operating the transfer mechanism, the dispensers, sealers, fillers and capper in timed relation. In the apparatus disclosed having fluid actuators for the several instrumentalities, the mechanisms are operated in timed relation under the control of a common sequence timer designated generally by the numeral 201 and operated under the control of a timer motor 202, conveniently of the variable speed type to enable adjustment of the overall cycle time. (see FIG. 12). The cycle timer diagrammatically disclosed in FIG. 12 is of a well known commercially available type and the timer 202 is conveniently in the form of an air operated motor connected to an air supply source 203. In general, the application of fluid pressure to the actuators 75 and 76 of the transfer mechanism is controlled by pilot controlled valve 204 having timer controlled pilots 204a. The dispenser actuators 49 are conveniently operated in unison under the control of a pilot controlled valve 205 having timer control pilots 205a. The sealing jaw actuators 111 and 111' are conveniently operated in unison under the control of a pilot controlled valve 206 operated under the control of pilot valves 206a and the actuators 119, 119' for the shell confining members are conveniently operated in unison under the control of pilot controlled valve 207 and having timer control pilots 207a. The cooling jaw actuators 152 and 152' are operated under the control of pilot controlled valve 208 having pilot controls 208a. The nozzle actuators 162 and the spout clamp actuators 177 are conveniently operated in unison under the control of a pilot controlled valve 209 having pilots 209a and the dispenser actuators 166 are operated under the control of pilot controlled valve 210 having pilots 210a. The capper actuator 190 is controlled by a pilot controlled valve 211 having pilot controls 211a. The motor 83 for reciprocating the transfer mechanism is conveniently of the air operated type and fluid is supplied to that motor under the control of a pilot controlled valve 212. The transfer mechanism drive motor is so operated as to drive the crank 81 through only one-half revolution to stop the transfer mechanism in each its extended and in its retracted positions. For this purpose, sensor valves 212c and 212d are operated by a cam 213 which rotates with the crank 81 and timer controlled pilots 212a and 212b are connected through the valves 212c and 212d to the valve 212 to selectively rotate the crank through one-half revolution at preselected time intervals.

The sequence control timer 201 is arranged to operate the several instrumentalities in timed relation with the operation of the transfer mechanism. In general, the timer will operate one of the pilots 212a to thereby actuate the valve 212 and drive the motor 83 through one-half revolution under the control of the valve 212c. At a later time in the cycle, the timer operates pilot valve 212b to again operate the valve 212 and drive the motor 83 through a succeeding one-half revolution, under the control of the valve 212d. The timer is arranged to operate one of the pilots 204a to actuate the valve 204 and apply pressure to the fluid actuators 75 and 76 during extension of the transfer members, and to operate another of the pilots 204a to thereby terminate the application of fluid pressure to the actuators 75 and 76 during retraction of the transfer members. While the transfer members are moving forward, the shell confining members 101, 101' and heat sealing jaws 102, 102' are retracted as are the cooling jaws 145, 145' and the nozzles 161. When the transfer members reach their forward position, the sequence control first operates one of the pilots 207a to move the shell confining members 101 and 101' inwardly into positions around the respective upper and lower shells before the transfer members are moved laterally outwardly. The sequence control then operates the other of the pilot valves 204a to retract the transfer members and, at about this time, the timer operates one of the pilot valves 205a to move the heat sealing jaws 102 and 102' toward each other to heat seal the flanges. The sequence control preferably operates one of the pilots 208a at about the same time as it operates one of the pilots 205a to move the cold jaws toward each other into engagement with opposition sides of the heat sealed flange, to cool and preferably shape the same. One of the pilot valves 209a is operated soon after the transfer members reach their forward position to thereby extend the nozzles into the containers and to grip the container spouts and the timer thereafter operates the dispenser actuators 166 to dispense a quantity of liquid into the containers. The capper 190 is operated under the control of the pilots 211a after the transfer members are extended. The dispenser actuators 49 are preferably operated while the transfer mechanism is in its forward position. The transfer mechanism is retracted while the heat sealing jaws and the cold jaws are closed and, after a time has elapsed sufficient to complete the heat sealing operation, the hot jaws are first opened and the transfer members then moved inwardly while the shell confining members are moved apart. The timing is preferably adjusted so that the shell engaging fingers on the transfer members engage the containers before the shell confining members are moved completely out of position around the containers so as to thereby prevent accidental displacement of the containers.

From the foregoing it will be seen that the packaging apparatus dispenses and assembles the shells in opposing face-to-face relation prior to advancing the same to the sealing station. Moreover, the transfer mechanism simutaneously advances both the upper and lower shells and holds the same in assembled relation during advance. Since the transfer mechanism engages the shells adjacent the flanged edges thereof, the transfer fingers can remain in engagement with the shells until after the shell confining members have been moved into position around the shells.

Although a number of modifications and variations may be made in the details of structure which have hereinbefore been described by way of example, it is intended that insofar as such variations and modifications do not depart from the basic principles which underlie the present invention, such changes are intended to be circumscribed by the spirit and scope of the present invention except as the same may be necessarily limited by the appended claims or reasonable equivalents thereof.

What is claimed is:

1. In a heat sealing apparatus for joining first and second preformed cup-like shells of thermoplastic material with their open sides in opposing face-to-face relation including:
   first and second shell engaging jaw members at a shell sealing station,
   means for moving said jaw members between a shell engaging position in opposing registry at opposite sides of a shell sealing plane to join the shells and a shell release position spaced laterally a substantial distance from said sealing plane,
   means for dispensing said first and second shells at a point spaced from said shell sealing station and for assembling and advancing the shells along a path paralleling said sealing plane to the sealing station comprising:
      first and second shell dispensers for dispensing said first and second shells at points spaced from the sealing station and with the open sides of the shells facing in relatively opposite directions,
      transfer means including transfer members adjacent opposite sides of said path and each having first and second sets of shell engaging members thereon disposed at relatively opposite sides of said sealing plane for respectively engaging said first and second shells adjacent their open sides,
      means for extending and retracting said transfer members in a direction lengthwise of said path,
      means for moving the shell engaging members laterally of said path into engagement with the shells during extension of the transfer members and out of engagement with the shells during retraction of the transfer members, and means for operating said jaw moving means in timed relation with said transfer members.

2. An apparatus according to claim 1 including a cooling station spaced along said path from said sealing station, said transfer members extending past said cooling station, said cooling station including,
   third and fourth jaw members, and means for moving said third and fourth jaw members in timed relation with said transfer members between a shell engaging position in opposing registry at opposite sides of said sealing plane and a shell release position spaced laterally a substantial distance from said sealing plane.

3. An apparatus according to claim 1 wherein said first dispenser dispenses said first shell at a first dispensing station and said second dispenser dispense said second shells at a second station spaced along said path from said first station, said transfer means advancing said first shells past said second station to assemble said first shells with respective ones of said second shells.

4. An apparatus according to claim 1 wherein said transfer means includes supports spaced along said path and mounted for sliding movement in a direction paralleling said path, and fluid actuators mounted on the supports for movement therewith and operatively connected to said transfer members for moving the latter laterally of said path.

5. In a heat sealing apparatus for joining first and second preformed cup-like shells of thermoplastic material with their open sides in opposing face-to-face relation including:
   upper and lower shell engaging jaw members at a shell sealing station,
   means for moving said jaw members between a shell engaging position in opposing registry at opposite sides of a shell sealing plane to join the shells and a shell release position spaced laterally a substantial distance from said sealing plane,
   means for dispensing said first and second shells at a point spaced from said shell sealing station and for assembling and advancing the shells along a horizontal path paralleling said sealing plane to the sealing station comprising:
      a first shell dispenser for dispensing said first shells one at a time to a first station spaced from said sealing station with the open side facing upwardly,
      a second shell dispenser for dispensing said second shells one at a time to a second station intermediate said first station and said sealing station with the open side of said second shell facing downwardly,
      transfer means including transfer members extending along opposite sides of said path and each having a lower set of shell engaging members at a level below the level of said sealing plane engageable with said first shells for advancing the same past said second station to said sealing station, said transfer members having an upper set of shell engaging fingers at a level above the level of said sealing plane engageable with the second shells for advancing the same with a respective one of the first shells as the latter moves past the second station,
      means for extending and retracting said transfer members in a direction lengthwise of said path,
      means for moving shell engaging members laterally of said path into engagement with the shells during extension of the transfer members and out of engagement with the shells during retraction of the transfer members,
   and means for operating said jaw moving means in timed relation with said transfer members.

6. An apparatus according to claim 5 including a first shell support at said first station for supporting the dispensed first shells with their open sides at a level adjacent the level of said sealing plane and a second shell support at said second station for supporting dispensed second shells with their open sides at a level adjacent the level of said sealing plane.

7. An apparatus for making containers from first and second preformed cup-like shells comprising, transfer means for advancing articles along a path, a first dispenser means for dispensing said first shells one at a time to a first station along said path with the open side thereof facing in one direction, a second dispenser means for dispensing said second shells one at a time to a second station along said path with the open side thereof facing in a relatively opposite direction, means at a third station along said path for joining the first and second shells, said transfer means including transfer members at opposite sides of said path each having a first set of shell engaging members engageable with said first shells for advancing the same along said path sequentially past said second and third stations and a second set of shell engaging members engageable with said second shells for advancing the latter in unison with respective ones of said first shells to said third station, means for operating said transfer means including means for intermittently extending and retracting said transfer members in a direction lengthwise of said path and means for shifting said transfer members laterally of said path to move the shell engaging member laterally of said path into engagement with the shells during extension of the transfer members and out of engagement with the shells during retraction of the ransfer members, and means for operating said first and second dispensers in timed relation with said transfer means.

8. An apparatus for making containers from first and second preforme d cup-like shells comprising, transfer means for advancing articles along a path, a first dispenser means for dispensing said first shells one at a time to a first station along said path with the open side thereof facing upwardly, a second dispenser means for dispensing said second shells one at a time to a second station along said path with the open side thereof facing downwardly, means at a third station for joining said shells, said transfer means including a lower set of shell engaging members engageable with said first shells for advancing the same along said path to said third station and an upper set of shell engaging members engageable with said second shells for advancing the same in unison with respective ones of said first shells to said first station, means for operating said transfer means, means for operating said first and second dispensing means in timed relation with said transfer means, said transfer means including elongated rigid transfer members at opposite sides of said path each having said lower and upper sets of shell engaging members thereon arranged to engage said first and second shells adjacent their respectitve open sides, said means for operating said transfer means including means for extending and retracting said transfer members in a direction lengthwise of said path, and means for shifting the transfer members to move the shell engaging members laterally of said path into engagement with the shells during extension of the transfer members and out of engagement with the shells during retraction of the transfer members.

9. An apparatus for making containers from first and second preformed cup-like shells comprising, transfer means for advancing articles along a path, a first dispenser means for dispensing said first shells one at a time to a first station along said path with the open side thereof facing upwardly, a second dispenser means for dispensing said second shells one at a time to a second station along said path with the open side thereof facing downwardly, means at a third station for joining said shells, said transfer means including a lower set of shell engaging members engageable with said first shells for advancing the same along said path to said third station and an upper set of shell engaging members engageable with said second shells for advancing the same in unison with respective ones of said first shells to said third station, means for operating said transfer means, means for operating said first and second dispensing means in timed relation with transfer means, a first shell support at said first station for supporting the dispensed shells at one level and a second shell support at said second station for supporting the dispensed shells at a second level spaced above said first level a distance at least as great as the height of the first shells, said transfer means being operable to advance one of said dispensed shells from the first station to the second station below said second shell support and to thereafter advance dispensed ones of said second shells in unison with a respective first shell to said third station.

10. An apparatus for making containers from first and second preformed cup-like shells comprising, transfer means for advancing articles along a path, a first dispenser means for dispensing said first shells one at a time to a first station along said path with the open side thereof facing upwardly, a second dispenser means for dispensing said second shells one at a time to a second station along said path with the open side thereof facing downwardly, means at a third station for joining said shells, said transfer means including a lower set of shell engaging members engageable with said first shells for advancing the same along said path to said third station and an upper set of shell engaging members engageable with said second shells for advancing the same in unison with respective ones of said first shells to said third station, means for operating said transfer means, means for operating said first and second dispensing means in timed relation with said transfer means, a first shell support at said first station for supporting the dispensed shells at one level and a second shell support at the second station for supporting the dispensed shells at a second level spaced above said first level a distance at least as great as the height of said first shells, said first and second sets of shell engaging members being arranged on said transfer means respectively below and above said second level to engage said lower and upper shells adjacent their respective open sides.

11. An apparatus for making container from first and second preformed cup-like shells comprising, transfer means for advancing articles along a path, a first dispenser means for dispensing said first shells one at a time to a first station along said path with the open side thereof facing upwardly, a second dispenser means for dispensing said second shells one at a time to a second station along said path with the open side thereof facing downwardly, means at a third station for joining said shells, said transfer means including a lower set of shell engaging members engageable with said first shells for advancing the same along said path to said third station and an upper set of shell engaging members engageable with said second shells for advancing the same in unison with respective ones of said first shells to said third station, means for operating said transfer means, and means for operating said first and second dispensing means in timed relation with said transfer means, a first shell support at said first station for supporting the dispensed shells at one level and a second shell support at said second station for supporting the dispensed shells at a second level spaced above said first level a distance at least as great as the height of the first shells, said transfer means including first and second transfer members at opposite sides of said path each having said upper and lower sets of shell engaging members thereon disposed respectively above and below said second level for engaging the upper and lower shells adjacent their respective open sides, said means for operating said transfer means including means for extending and retracting said transfer members in a direction lengthwise of said path, and means for shifting said transfer members to move the shell engaging members laterally of said path into engagement with the shells during extension of the transfer members and out of engagement with the shells during retraction of the transfer members.

12. An apparatus for assembling containers from first and second preformed cup-like shells and filling the same comprising, shell sealing means including first and second shell engaging jaw members at a sealing station, means for moving said jaw members between a position in opposing registry at opposite sides of a horizontal shell sealing plane to join the shells and a shell release position spaced laterally a substantial distance from said sealing plane, container filling means at a filling station for filling the sealed containers, means for dispensing said first and second shells at dispensing stations spaced from the sealing and filling stations, transfer means for assembling said first and second shells and for advancing the assembled shells along a path to the sealing station and for advancing the sealed shells past the filling station, said transfer means including transfer members extending along opposite sides of said path and each having first and second sets of shell engaging members disposed respectively below and above said horizontal sealing plane for engaging said first and second shells adjacent their open sides, means for extending and retracting said transfer members, means for shifting said transfer members to move the shell engaging members laterally of said path into engagement with the shells during extension of the transfer members and out of engagement with the shells during retraction of the transfer members to advance the shells in step fashion, and means for operating said shell sealing means and said filler means in timed relation with said transfer means.

References Cited

UNITED STATES PATENTS 3,297,504  1/1967  Brown et al. _____ 156—556 X

THERON E. CONDON, *Primary Examiner.*

U.S. Cl. X.R.

53—373

PO-1050
(5/69)

UNITED STATES PATENT OFFICE
CERTIFICATE OF CORRECTION

Patent No. 3,453,803          Dated July 8, 1969

Inventor(s) Albert B. Mojonnier

It is certified that error appears in the above-identified patent and that said Letters Patent are hereby corrected as shown below:

Column 11, line 27, "first", second occurrence, should be -- third --.

SIGNED AND
SEALED

NOV 4 1969

(SEAL)
Attest:

Edward M. Fletcher, Jr.
Attesting Officer

WILLIAM E. SCHUYLER, JR.
Commissioner of Patents